(12) United States Patent
Myslowski et al.

(10) Patent No.: US 8,500,899 B2
(45) Date of Patent: Aug. 6, 2013

(54) METHOD FOR PRODUCTION OF GRANULATED POLYMER-ASPHALT BINDER AND SULFUR CONCRETE WITH PARTICIPATION OF SULFUR POLYMER OBTAINED IN WASTE SULFUR SOLVENT—BORNE MODIFICATION

(75) Inventors: Wlodzimierz Myslowski, Bielsko-Biala (PL); Andrzej Janiczek, Nowa Wies (PL)

(73) Assignee: Wlodzimierz Myslowski (PL)

( * ) Notice: Subject to any disclaimer, the term of this patent is extended or adjusted under 35 U.S.C. 154(b) by 0 days.

(21) Appl. No.: 13/512,122

(22) PCT Filed: Nov. 15, 2010

(86) PCT No.: PCT/PL2010/000116
§ 371 (c)(1),
(2), (4) Date: Jul. 12, 2012

(87) PCT Pub. No.: WO2011/065849
PCT Pub. Date: Jun. 3, 2011

(65) Prior Publication Data
US 2012/0275861 A1    Nov. 1, 2012

(30) Foreign Application Priority Data

Nov. 25, 2009  (PL) .......................................... 389668
Dec. 8, 2009   (PL) .......................................... 389824

(51) Int. Cl.
*C08L 95/00*   (2006.01)
(52) U.S. Cl.
USPC .......................................................... 106/274
(58) Field of Classification Search
CPC ......................................................... C10C 3/00
USPC ............................. 404/17, 27, 31, 32, 75, 82
See application file for complete search history.

(56) References Cited

U.S. PATENT DOCUMENTS

| 157,543 A | 12/1874 | Reynolds |
| 191,553 A | 6/1877 | Sherburne et al. |

(Continued)

FOREIGN PATENT DOCUMENTS

PL    211111    6/2011

*Primary Examiner* — Raymond W Addie
(74) *Attorney, Agent, or Firm* — Cherskov Flaynik & Gurda, LLC

(57) ABSTRACT

The method of production of granulated polymer-asphalt binder and sulphur concrete with the participation of sulfur polymer obtained through solvent-borne modification of waste sulfur at the temperature of 135-150° C. consists in composing this sulfur polymer with other ingredients. At the production of granulated polymer-asphalt binder the content of the sulfur polymer amounts to 40-60% by weight which, after heating to the temperature of 135-150° C., is mixed (mixer 2) with 20-40% by weight of waste phosphogypsum and after they are mixed, 15-20% by weight of D-50 road asphalt is dosed, which dissolves in this mixture reacting partly with the sulfur polymer. Next, this mixture is cooled to plastic form and granules of polymer-asphalt binder are formed in the extruder, which fall into 5% solution of silicone emulsion where they are cooled and covered with a layer of silicone emulsion. At the production of sulfur concrete at the temperature of 135-150° C., sulfur polymer in the amount of 25-35% by weight is mixed with waste phosphogypsum in the amount of 10-20% by weight (mixer 2); then the material flows downwards where it is mixed (mixer 1) with hot mineral material and waste slag from copper smelting. Liquid sulfur concrete, which is cooled and crushed into grains of 0-1 cm or poured into molds, is formed. The produced polymer-asphalt binder is used for making a binder course in road surfaces and for road repairs. The produced sulfur concrete is used for basic foundations in road surfaces.

11 Claims, 14 Drawing Sheets

U.S. PATENT DOCUMENTS

Figure 2:
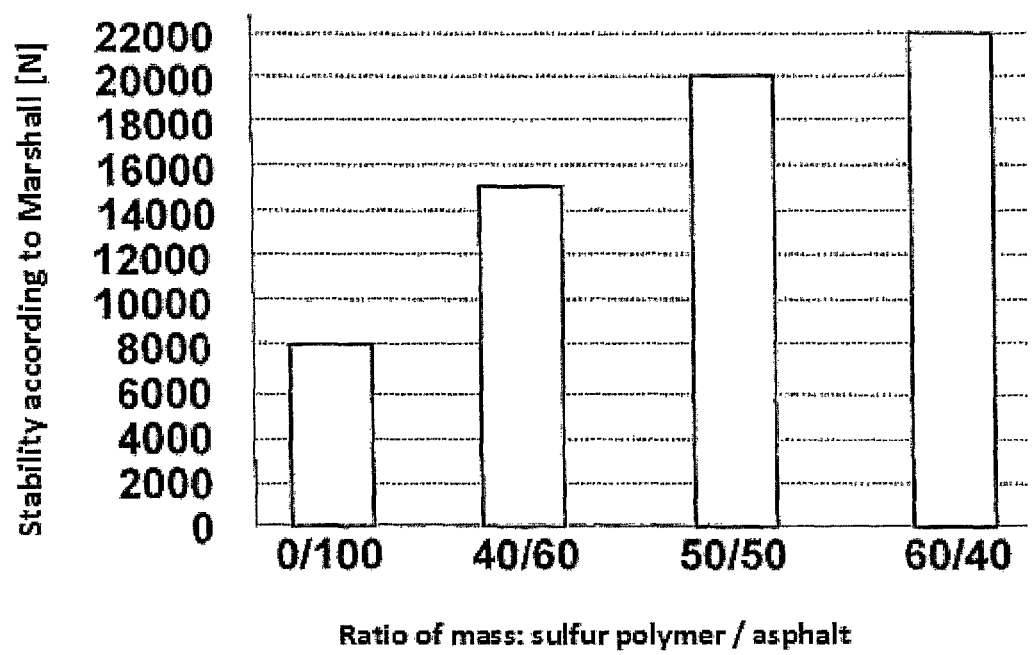

| | | | | |
|---|---|---|---|---|
| 4,058,500 A | * | 11/1977 | Vroom | 523/219 |
| 4,348,313 A | * | 9/1982 | McBee et al. | 524/788 |
| 4,400,413 A | * | 8/1983 | Emmons et al. | 427/136 |
| 5,032,706 A | * | 7/1991 | Goessler | 219/462.1 |
| 5,453,212 A | * | 9/1995 | Annemaier et al. | 252/70 |
| 5,709,824 A | * | 1/1998 | Ytterberg et al. | 264/34 |
| 2006/0201393 A1 | * | 9/2006 | Rice et al. | 106/644 |
| 2009/0095820 A1 | * | 4/2009 | Roser et al. | 238/2 |
| 2010/0256265 A1 | * | 10/2010 | Hussein et al. | 524/59 |
| 2011/0218274 A1 | * | 9/2011 | Crews et al. | 524/60 |
| 2012/0022182 A1 | * | 1/2012 | Ranka | 523/351 |

* cited by examiner

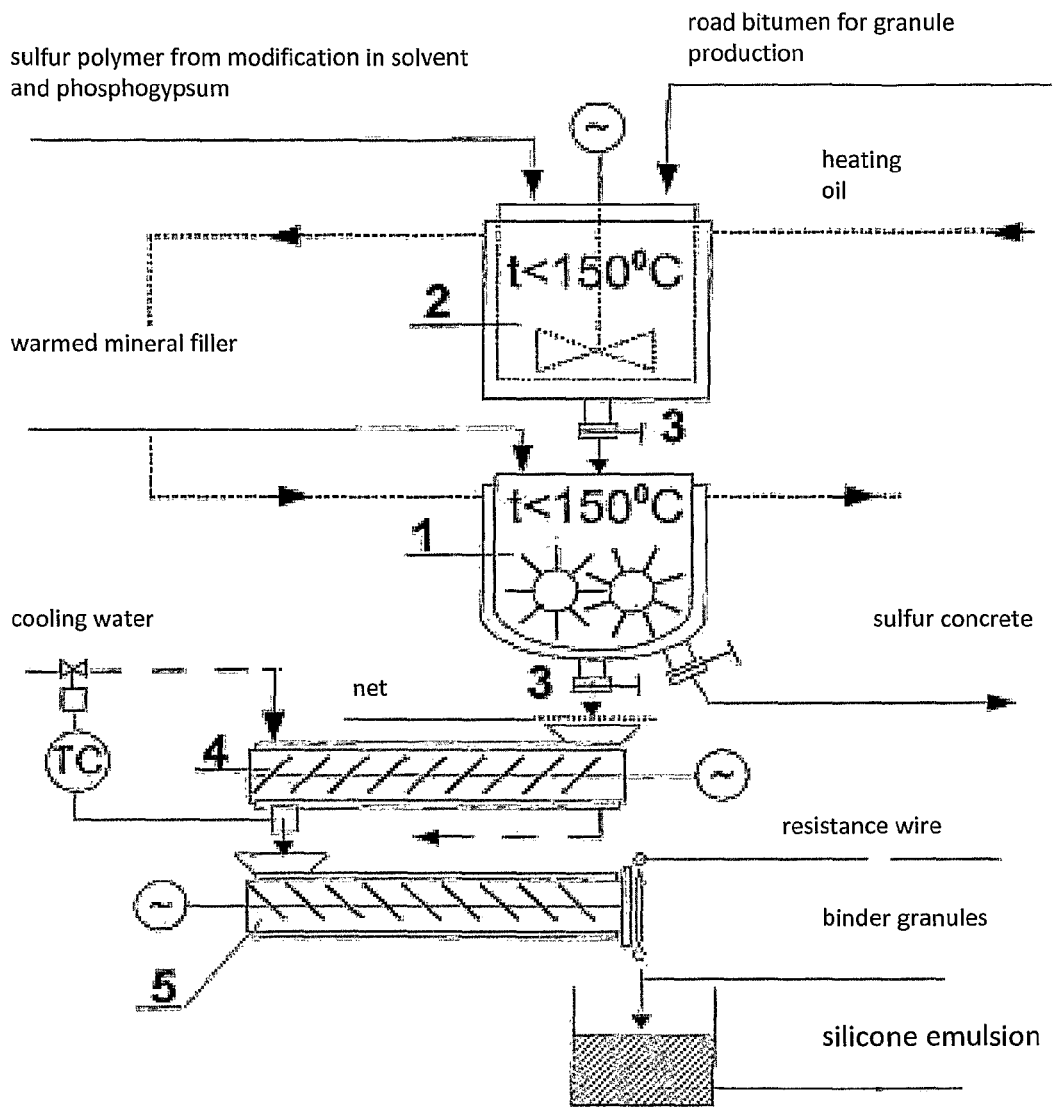
Legend:
1 – mixer V – 4m³
2 – mixer V – 4m³
3 – drain valve
4 – screw-conveyor feeder
5 – extruder of binder granules
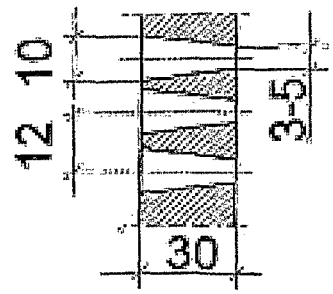
*Fig. 1*

Traditional surface of a KR6 type road acc. to the standard
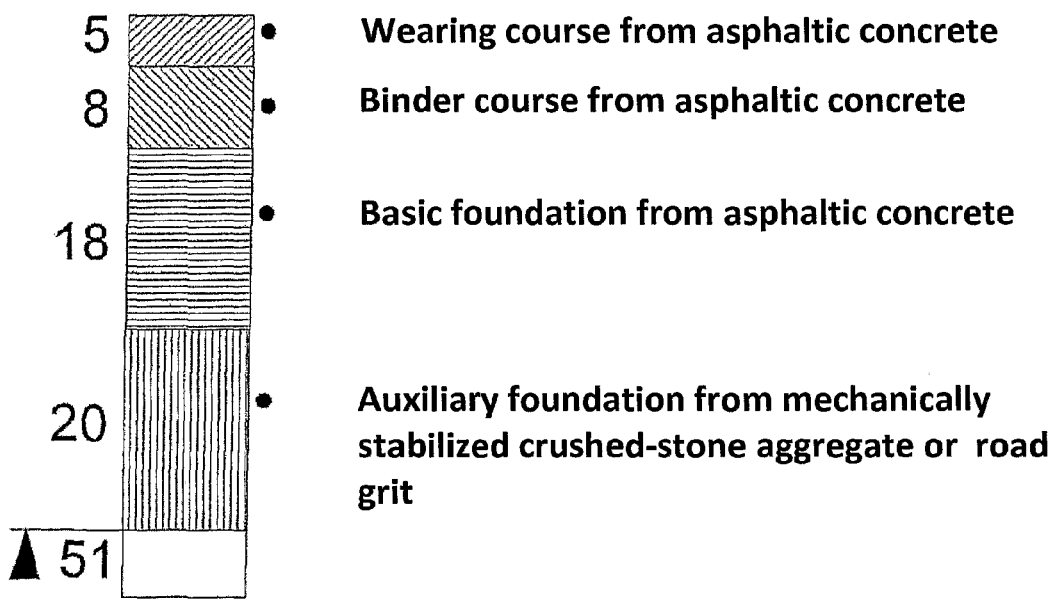
Proposed surface of a KR6 type road
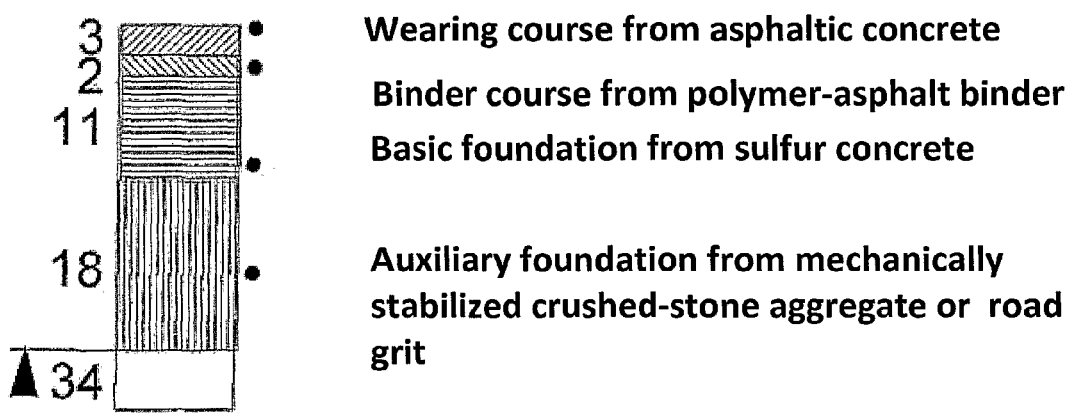
*Fig. 6*

Traditional surface of a KR5 type road acc. to the standard

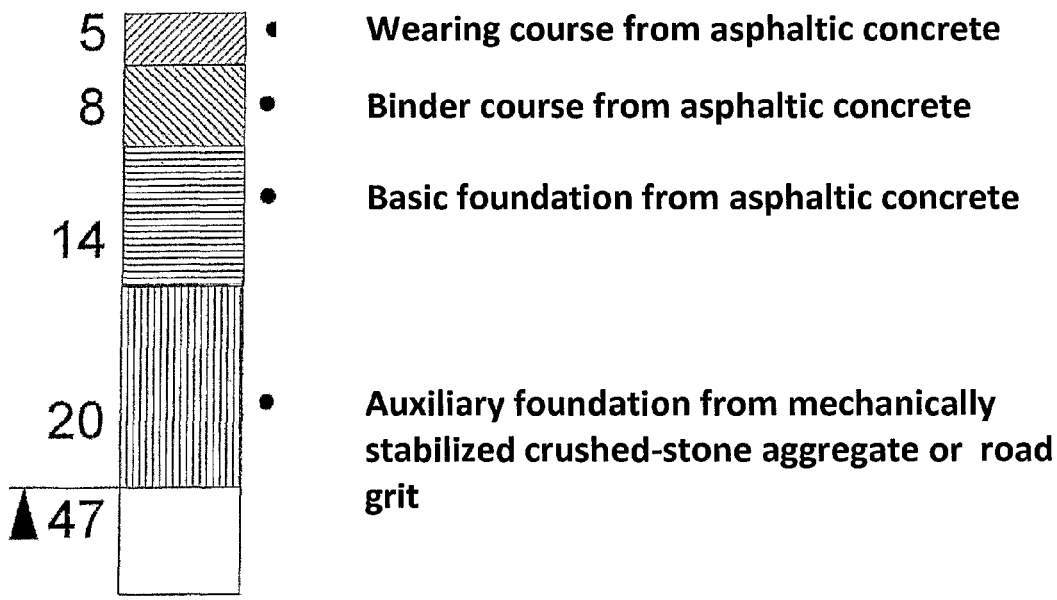

- Wearing course from asphaltic concrete
- Binder course from asphaltic concrete
- Basic foundation from asphaltic concrete
- Auxiliary foundation from mechanically stabilized crushed-stone aggregate or road grit

Proposed surface of a KR5 type road

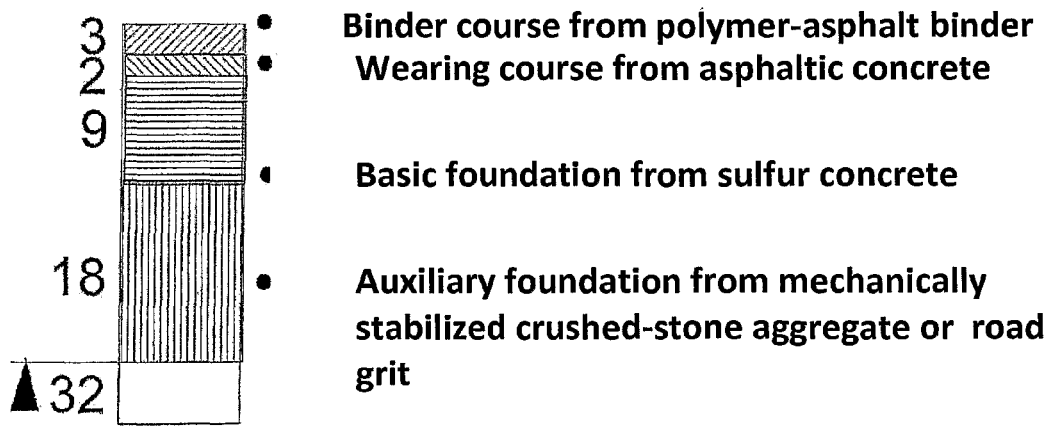

- Binder course from polymer-asphalt binder
- Wearing course from asphaltic concrete
- Basic foundation from sulfur concrete
- Auxiliary foundation from mechanically stabilized crushed-stone aggregate or road grit

*Fig. 7*

Traditional surface of a KR4 type road acc. to the standard

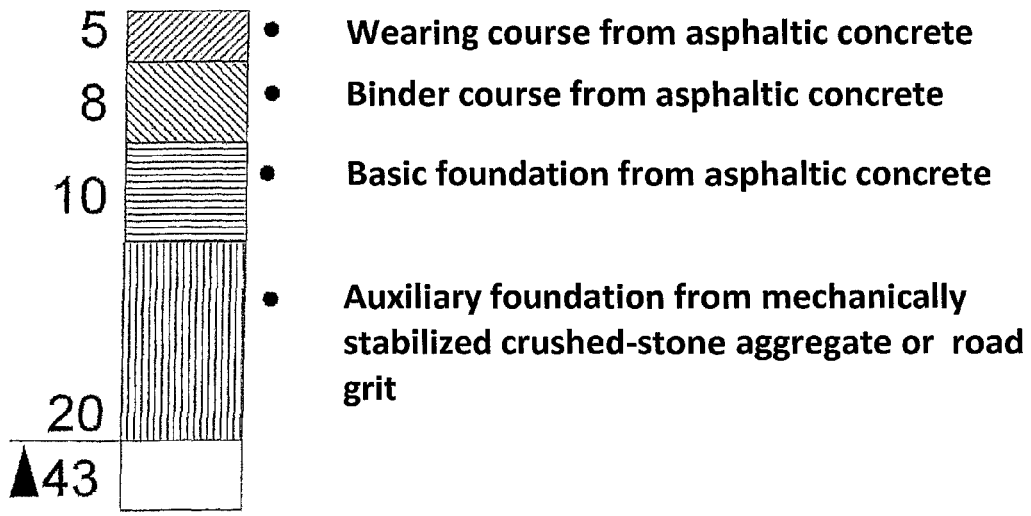

- Wearing course from asphaltic concrete
- Binder course from asphaltic concrete
- Basic foundation from asphaltic concrete
- Auxiliary foundation from mechanically stabilized crushed-stone aggregate or road grit Proposed surface of a KR4 type road

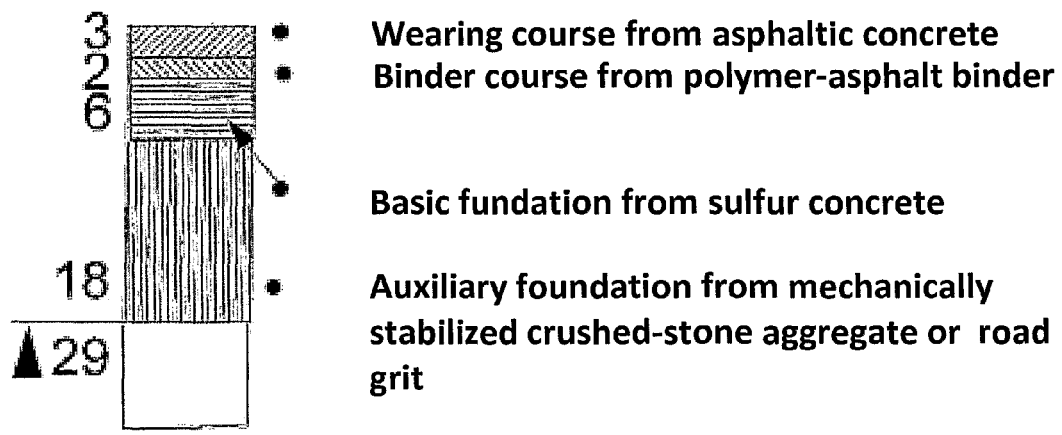

- Wearing course from asphaltic concrete
- Binder course from polymer-asphalt binder
- Basic fundation from sulfur concrete
- Auxiliary foundation from mechanically stabilized crushed-stone aggregate or road grit

*Fig. 8*

Traditional surface of a KR3 type road acc. to the standard
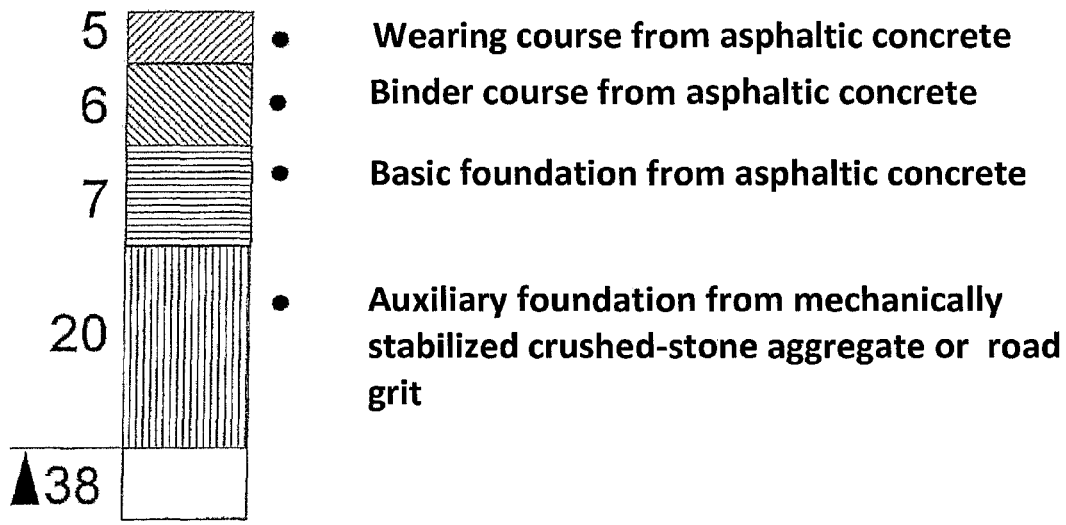
Proposed surface of a KR3 type road
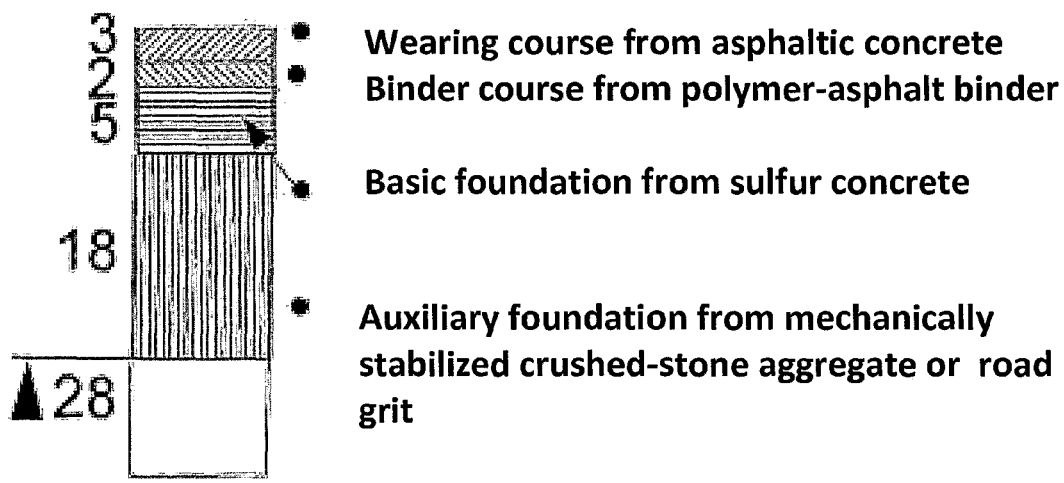
*Fig. 9*

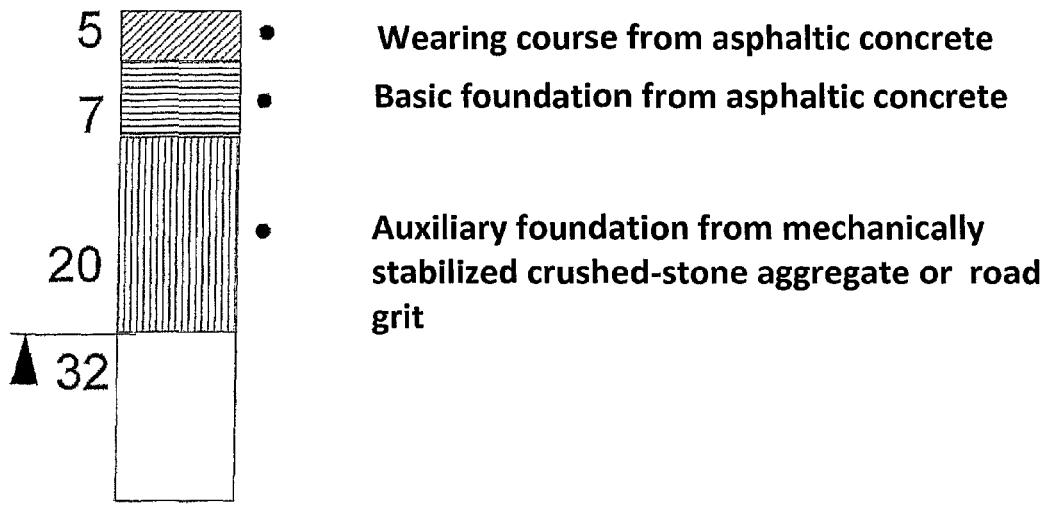
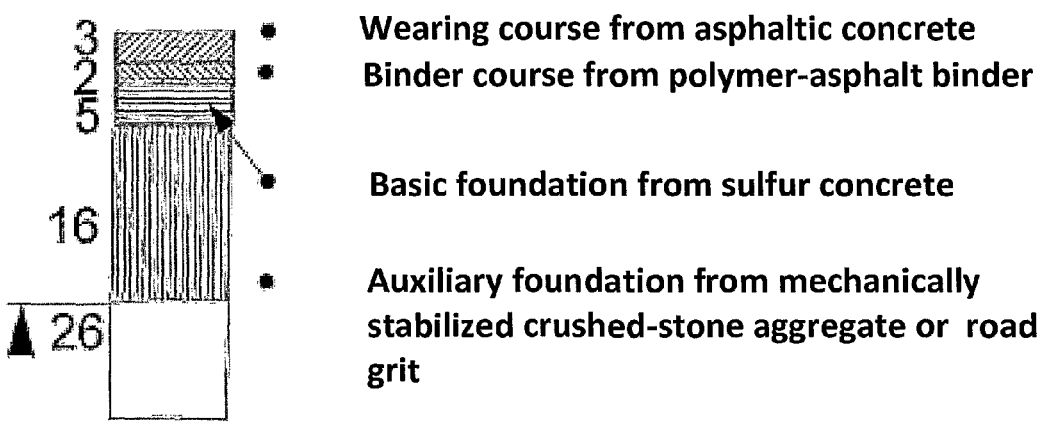
Fig. 10

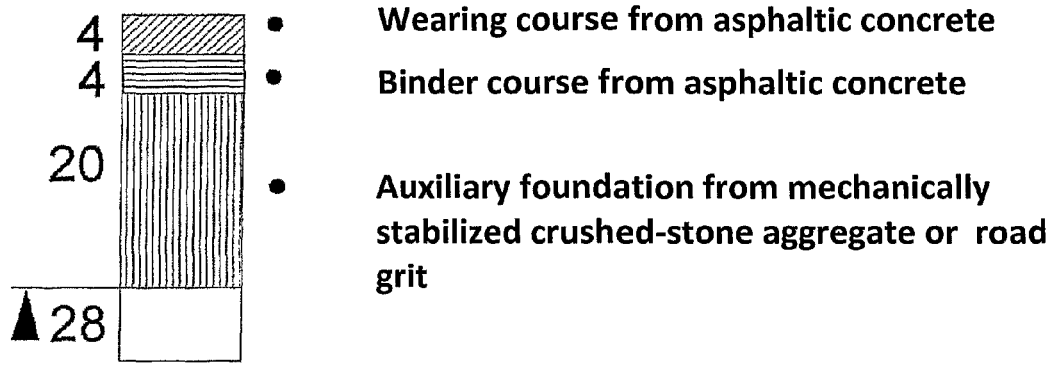
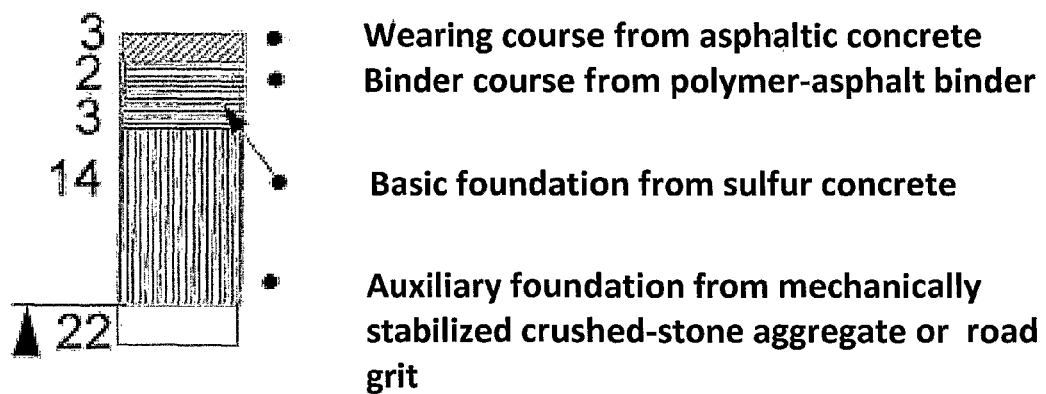
Fig. 11

Repair of roads on traditional asphaltic binder
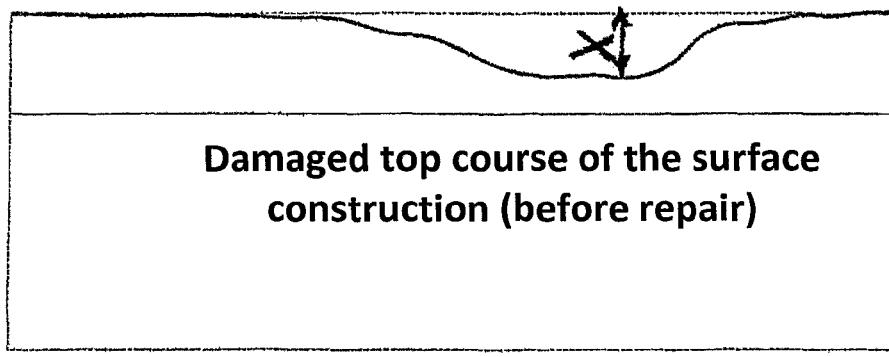
Mix of polymer-asphalt binder with 5/11 mm basalt
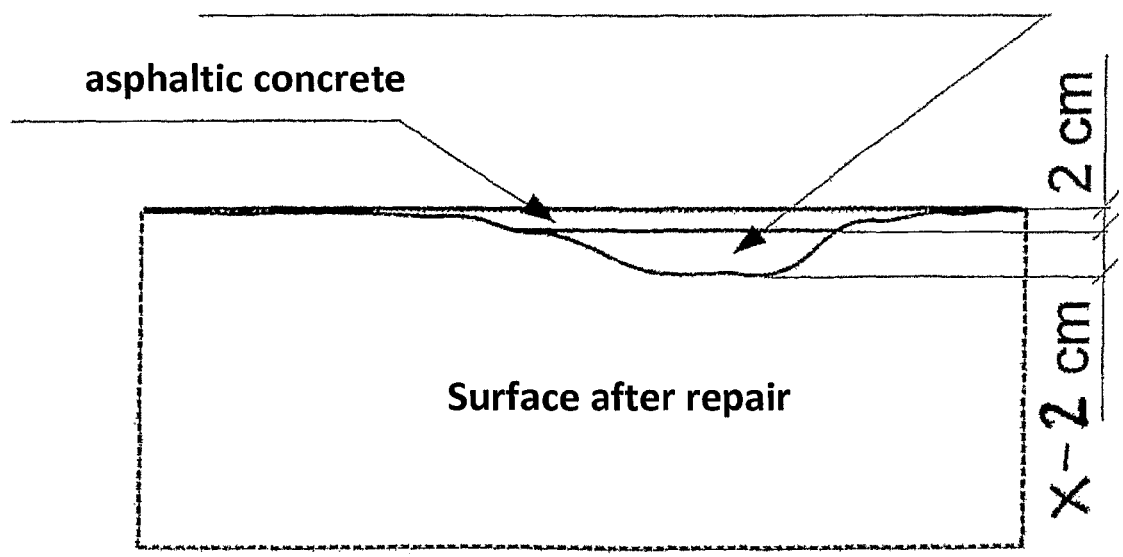
*Fig. 13*

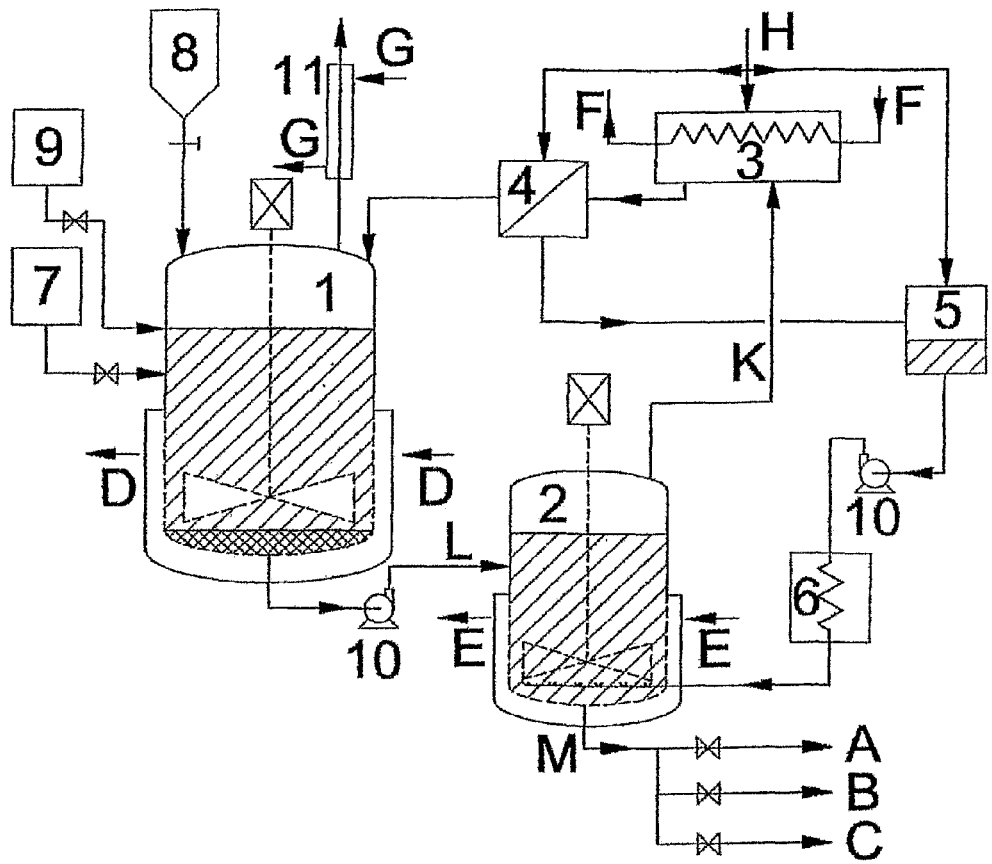

Legend

1 - mixer, 2 - evaporator, 3 – water cooler, 4 – separator, 5 – water tank,
6 – steam generator, 7 – modifier feeder, 8 – sulfur feeder, 9 – solvent feeder,
10 - pump, 11 – reflux condenser
A – to production of sulfur concrete
B – to production of road binder
C – for flakers
DD – inlet, outlet of heating oil
EE – inlet, outlet of heating oil
FF – inlet, outlet of water; GG – inlet, outlet of water
H – nitrogen 2.5 atm
K – vapours of the solvent, modifier, water
L – contaminated sulfur polymer
M – contaminated sulfur polymer

*Fig. 14*

METHOD FOR PRODUCTION OF GRANULATED POLYMER-ASPHALT BINDER AND SULFUR CONCRETE WITH PARTICIPATION OF SULFUR POLYMER OBTAINED IN WASTE SULFUR SOLVENT—BORNE MODIFICATION

CROSS REFERENCE TO RELATED APPLICATIONS

This application claims the benefit as a nationalization of PCT Application PCT/PL10/00116, filed on Apr. 30, 2010, currently pending, which turn claims priority to Polish Utility Application No. P-389668, filed on Nov. 25, 2009, patented as Polish patent No. PL-211111 on Apr. 30, 2012, and also to Polish Utility Application NO. P-389824, filed on Dec. 8, 2009.

DETAILED DESCRIPTION

The object of the invention is the method of production of granulated polymer-asphalt binder and sulfur concrete with participation of sulfur polymer obtained in solvent-borne modification of waste sulfur according to the Patent Application P-389668 presented in FIG. 1 and their application in construction and repairs of road surfaces presented in the FIG. to FIG. 13.

The sulfur polymer obtained by this method is applied in two directions. The first direction is that after mixing with mineral fillers the so-called sulfur concrete is obtained. Sulfur concrete is a material similar to traditional concrete but of functional properties much better than traditional concrete, such as: higher durability, quick setting up, oil resistance, water resistance and acid resistance, better dying with colouring agents, easy to recover, does not require use of water. The second direction is mixing with road asphalt and waste phosphogypsum and appropriate forming it into a granule shape; road binder is thus obtained. Thus obtained granulated road binder, after mixing it with mineral materials used in highway engineering, creates road surfaces of properties much better than surfaces on traditional road asphalts. It concerns properties such as: higher fatigue life, higher flexibility, no deformations at higher temperatures, possibility to use worse mineral aggregates, longer operation time, reduction of the amount of materials for pavement construction, reduction of the amount of road asphalts for road construction.

Waste phosphogypsum contained in the binder contains aluminium oxides, iron(ll) and iron(lll) compounds decreasing the emission of hydrogen sulphide when mixing sulfur polymer with asphalt.

There are known methods of sulfur polymers manufacture. U.S. Pat. Nos. 4,058,500 and 4,348,313 disclose a sulfur polymer where sulfur is modified by mixing with olefin hydrocarbons at a proper temperature. The same, sulfur polymers manufactured in Poland are based on mixing sulfur with olefin hydrocarbons at a proper temperature.

Contrary to solutions applied up to now, the most important quality of the sulfur polymer according to the invention is that the modification of waste sulfur is conducted in a solvent, which is 2-ethylhexyl alcohol, with the use of a modifier, which is unsaturated aldehyde: 2-ethyl-3-propylacrolein. The modifier, like sulfur, is very well soluble in the solvent. At the temperature of 120-135° C., waste sulfur decomposes into chain fragments, which undergo copolymerisation reaction with the modifier particles. As a result of very good dissolving of both sulfur and the modifier in the solvent, a very large active surface of reagents is created, the speed of reaction increases a few thousand times and sulfur modification time in order to create highly-molecular compounds of polymer properties is shortened. Sulfur polymer of very high degree of change of sulfur into polymeric form is obtained with very high reaction speed, and thus, in a short time, that makes this solution different from other applied methods. The polymer does not dissolve in the solvent and is precipitated from it on the bottom of the mixer. This method ensures also much higher efficiency of industrial processes in comparison with the so far applied methods. 2-ethylhexyl alcohol is a sulfur modification solvent of the following properties: it has high boiling point of 184.8° C. , creates with water azeotrope composed of 20% by weight of 2-ethylhexyl alcohol and 80% by weight of water of boiling point of 99.1° C.; it is significant when separating remains of the solvent from the sulfur polymer with the use of water vapour, which together with alcohol creates azeotrope, while the polymer insoluble in water remains at the bottom of the evaporator.

Used 2-ethylhexyl alcohol is relatively safe in operations and, due to its high boiling point, is not very volatile. It is classified into "low-toxic compounds".

Unsaturated aldehyde 2-ethyl-3-propylacrolein, which is very well soluble in the above mentioned alcohol already at the room temperature, is a sulfur modifier. It has got two active centres, i.e., a C=C double bond and an aldehyde group.

The boiling point of 2-ethyl-3-propylacrolein is 175° C. and is similar to the solvent. 2-ethyl-3-propylacrolein forms with water azeotrope comprising 39.2% of 2-ethyl-3-propylacrolein and 60.8% of water. The boiling point of azeotrope is 79.6° C.; it is significant when separating remains of the modifier from the sulfur polymer with the use of water vapour, which forms azeotrope with 2-ethyl-3-propylacrolein, while the polymer undissolved in water remains at the bottom of the evaporator. Waste sulfur subjected to solvent-borne modification is a waste from desulfurization of mainly natural gas comprising 99.9% by weight of sulfur and 0.01% by weight of ash and minute quantities of arsenic and selenium. The method of production of sulfur polymer obtained in sulfur solvent-borne modification is illustrated by FIG. 14; it is of cyclic run.

2-ethylhexyl alcohol in appropriate amounts from 45 to 55% by weight is batched to a membrane mixer heated by heating oil, in which, at constant mixing, the working temperature is of 120-135° C. To the 2-ethylhexyl alcohol batched beforehand the modifier of waste sulfur which is the 2-ethyl-3-propylacrolein aldehyde in the amount of 10-15% by weight is added; it is a few times more than follows from modification needs in order to shift the modification balance towards forming of the polymer.

Mixing of the solvent with the modifier occurs at the temperature of 120-135° C. In the mixed solvent and modifier, the amount of aldehydes and double bonds is tested analytically for comparative purposes. To such prepared solution of the solvent with the modifier, at the temperature of 120-135° C. and at constant mixing, the waste sulfur in the amount of 35-40% by weight is added; the waste sulphur at this temperature decomposes into chain fragments. In 10-15 minutes at this temperature modification of the waste sulfur with the modifier occurs, as a result of which highly-molecular compounds forming sulfur polymer, which fall out of the solution to the bottom of the mixer, are formed. After 10-15 minutes the agitator in the mixer is turned off for good decantation of sulfur polymer from the solution. The contaminated sulfur polymer is collected from the bottom of the mixer by a pump and batched to the evaporator. In the evaporator the sulfur polymer is kept in a liquid state at the temperature of ca. 125°

C. and the pressure of ca. 2.5 atm; Jive" steam is batched into it in order to vaporize in the form of azeotrope both the remains of the solvent and the modifier, vapours of which, upon leaving the evaporator, are condensed and directed to the separator. In the separator, the bottom layer, i.e. water, is separated from the top layer, i.e. the solvent and the modifier. The bottom layer is directed to the steam generator in order to re-convert it into water vapour, while the top layer is recycled to the mixer to be used in the next cycle of modification. After removing the sulfur polymer from the mixer, new weighed portions of the waste sulfur are batched into it upon prior supplementing the loss of modifier in the mixer on the basis of analysis of the contents of double bonds and aldehydes in the mixture and the next cycle of sulfur polymer forming begins. The sulfur polymer, purified of the solvent and the modifier, is collected in a liquid form from the bottom of the evaporator by the pump and directed to sulfur concrete production. Sulfur concrete obtained from the sulfur polymer and mineral fillers possesses better properties than concrete on Portland cement and so: compression resistance 55-80 MPa, breaking resistance approx. 8 MPa and low water absorbability of ca. 0.02%. Cast stones in which Portland cement has been used so far, i.e. kerbs, concrete rings, sewage pipes, drainage troughs, seawalls, paving blocks, road bases, can be made from it. The sulfur polymer is also directed to the production of granulated road binder, which is made after mixing of the sulfur polymer in the amount of 30-50% by weight with road asphalt in the amount of 10-20% by weight and waste phosphogypsum in the amount of 40-60% by weight, and then formed into granules coated with silicone.

Granulated road binder mixed with mineral material is used for production of pavements of increased functional properties such as: temperature of surface softening according to "Ring and Sphere" method >100° C., rigid layers resistant to rutting since their stability according to Marshall is ca. 75% higher than of traditional conventional mixes. Granulated road binder reduces asphalt consumption by ca. 20% and reduces mineral materials consumption by ca. 25%, in comparison to conventional road mixes owing to high durability and mechanical strength of a road made on the basis of this binder.

The sulfur polymer can be directed to the machine called a "flaker", where it assumes the form of small solid flakes packed into bags of different sizes with the possibility of later use by various customers.

Unexpected properties of such a big improvement of sulfur concrete properties and a big improvement of road parameters as mentioned above are owed to the sulfur polymer obtained through the modification of waste sulfur with 2-ethyl-3-propylacrolein aldehyde in the 2-ethylhexyl alcohol solvent. The sulfur polymer obtained with this method is of a very good quality, free from unmodified sulfur and obtained in a short time.

It is significant for the quality of products made from it.

The method of production of the sulfur polymer through its modification with unsaturated 2-ethyl-3-propylacrolein aldehyde in the 2-ethylhexyl alcohol solvent has been defined more closely in the examples of embodiment.

EXAMPLE I

Sulfur polymer obtained in composition of % by weight
waste sulfur 35
2-ethyl-3-propylacrolein modifier 10
2-ethylhexyl alcohol solvent 55
100

Produced in the following way: weighed amounts of the solvent and the modifier are batched into a vertical mixer heated indirectly, equipped with a heating jacket—Figure No 1.

The solvent and the modifier are heated to the temperature of 120-135° C. at constant mixing with the rotational speed of approx. 30 rpm. At this temperature weighed amounts of waste sulfur are added to the mix of the solvent and the modifier; the waste sulphur dissolves completely in the solvent and decomposes into chain fragments which undergo the reaction of copolymerisation with the modifier particles. Particles of sulfur polymer of highly-molecular compound properties which "fall out" of the solvent, are created.

After about 10 minutes the agitator of the mixer is stopped for better decantation of the sulfur polymer at its bottom. The liquid sulfur polymer is pumped from the bottom of the mixer by a pump to the evaporator where at the temperature of ca. 125° C. and at the pressure of 2.5 atm remains of the solvent and the modifier are evaporated with the use of "live" steam in the form of azeotropic distillation with water. Vapours of the solvent, the modifier and water are after condensation directed to the separator, the bottom layer of which, i.e. water, supplies the steam generator, and the top layer, i.e. the solvent and the modifier, is directed back to the mixer. The liquid sulfur polymer purified with the use of "live" steam is collected from the bottom of the evaporator with the pump and is directed to processing into sulfur concrete or granulated road binder or to the flaker for crushing and storing in packages for later use.

EXAMPLE II

Sulfur polymer obtained in composition of % by weight
waste sulfur 40
2-ethyl-3-propylacrolein modifier 15
2-ethylhexyl alcohol solvent 45
100

The method of production as in Example I; the difference is that modification time is extended to 15 minutes due to larger amount of modified sulfur.

Granulated polymer-asphalt binder and sulfur concrete produced in this way possess unexpected new functional properties that have not occurred so far in materials for pavement construction and so the granulated polymer-asphalt binder has got:

a shape of non-stick granules coated with silicone emulsion, which can be thus transported and stored in bags or other packages;

it liquefies hot in the mixture factory during mixing with hot mineral materials or spontaneously when heated to the temperature of ca. 110° C.;

it surpasses with its functional properties asphaltic concretes if it comes to stability as time goes on, lower sensitivity to temperature changes, lower influence of the change of load;

used as a binder course it retains very good mechanical strength, good elasticity at high vehicular traffic and good protection of the road foundation of sulfur concrete through vibration absorption;

as a binder course in a road surface it binds well the wearing course with its foundation of sulfur concrete on the principle of thermal gluing of these courses; —polymer-asphalt binder granules contain agents limiting hydrogen sulphide fumes.

Sulfur concrete obtained with this method possesses good functional properties for making road surface foundations, and so:

three times higher compression strength, bending strength than the concrete on Portland cement, that causes lower consumption of this material when making foundations of road surfaces;

water absorbability of merely 0.02%;

frost resistance;

short time of setting of the foundation made, of approx. 2 hours from its pouring, that after this time allows to further apply the binder course of polymer-asphalt binder and then wearing course of the road surface;

possibility of complete repeated use of sulfur concrete;

low emission of carbon dioxide at production of sulfur concrete in comparison with cement production.

Summing up, good unexpected functional properties of the above mentioned road materials, that is, granulated polymer-asphalt binder and sulfur concrete, which fundamentally influence changes in construction of road surfaces in KR1, KR2, KR3, KR4, KR5, KR6 categories contributing to considerable improvement of their functional properties as well as reduction of construction costs, are due to high quality of the sulfur polymer obtained in modification of waste sulfur with 2-ethyl-3-propylacrolein modifier in 2-ethylhexyl alcohol solvent according to P-389668 Application.

FIG. 2 to FIG. 5 illustrate the properties of mixes with sulfur polymer obtained according P-389668 Application.

FIG. 2—illustrates relation of stability according to Marshall vs. the ratio of sulfur polymer mass to asphalt. It is clearly evident that stability according to Marshall increases with the content of sulfur polymer.

Figure 3:
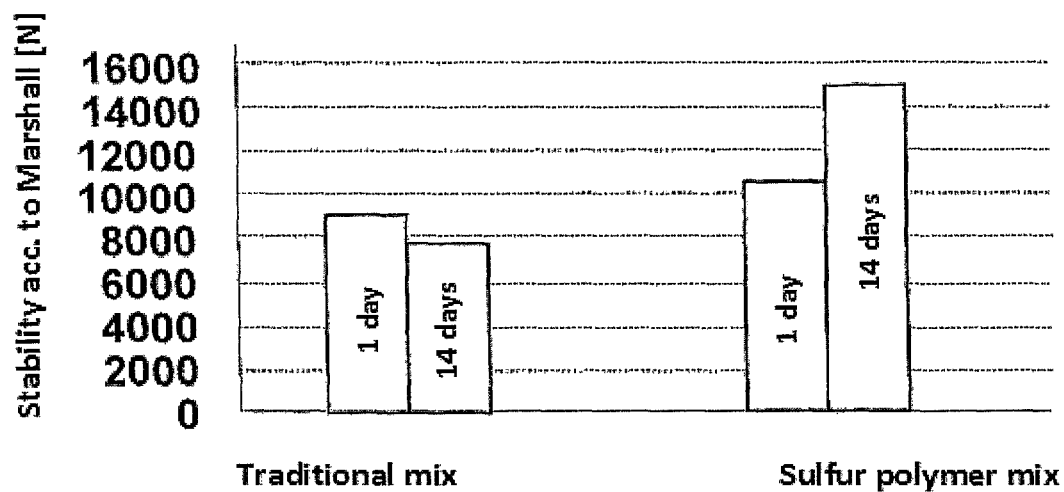

FIG. 3—compares stability of traditional mixes with mixes with sulfur polymer, where higher stability according to Marshall can be clearly seen in mixes with sulfur polymer in comparison to a traditional mix after longer time.

Figure 4:
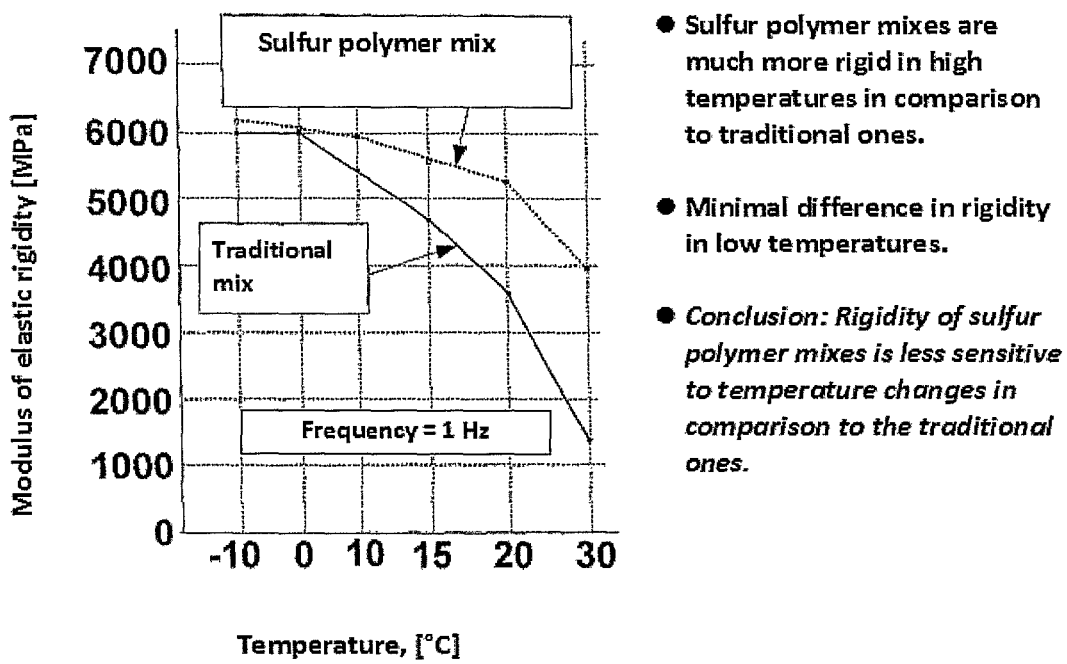

FIG. 4—compares rigidity of mixes from sulfur polymer with rigidity of traditional mixes at a specified temperature. It is clearly evident that the rigidity of mixes from sulfur polymer is less sensitive to temperature changes in comparison to traditional mixes.

Figure 5:
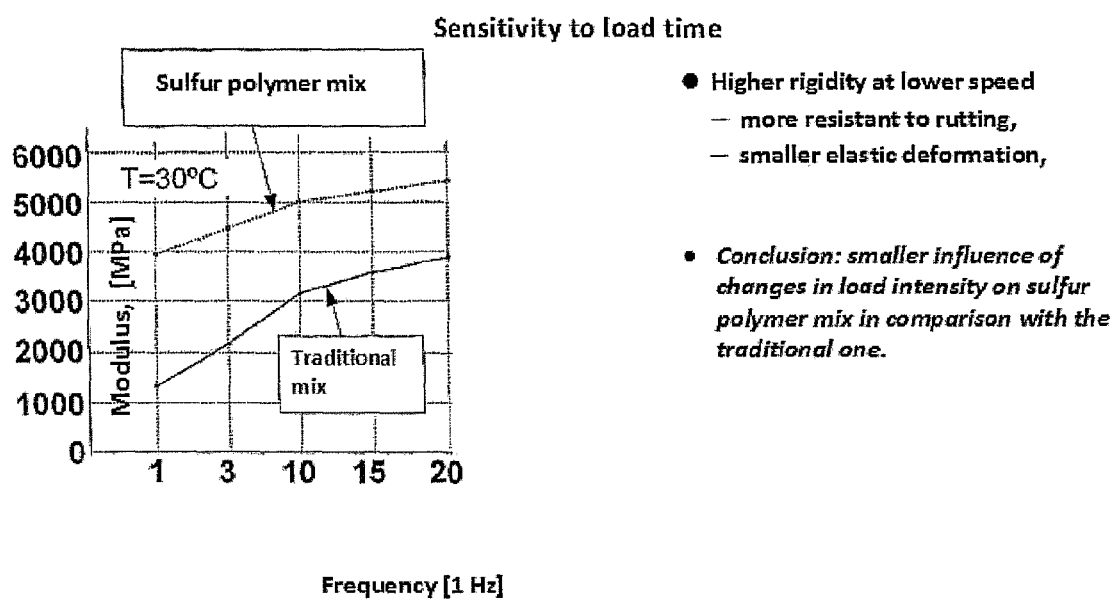

FIG. 5—compares sensitivity to the duration of load of sulfur polymer mix in comparison to traditional mix at the temperature of 30° C. Lower influence of changes in the load intensity on the sulfur polymer mix in comparison to traditional mix can be clearly seen.

There are known methods of modification of road asphalts as road binder through addition of modifiers.

U.S. Pat. No. 1,993,982 demonstrates that paraffin from Fischer-Tropsch Synthesis is added to asphalt by mixing.

U.S. Pat. No. 157,543 demonstrates that bituminous road binder is obtained from road asphalt by adding to it plasticised coal-tar pitch.

U.S. Pat. No. 191,553 demonstrates production of road asphalts used as road binder of low thermal sensitivity through composing different asphalts of different physicochemical properties.

However, unexpected functional properties of the produced granulated polymer-asphalt binder from which both, a wearing course, after additional melting-in of grit of appropriate granulation, and a binder course of road surfaces can be produced, cause significant improvement of road surface quality, increasing the time of their utilization, and reduce consumption of materials for road construction that makes them different from the existing solutions.

There are also known methods of production of sulfur concretes from sulfur polymer obtained through another modification of waste sulphur. U.S. Pat. Nos. 4,058,500 and 4,348,313 demonstrate sulfur binder where sulfur is modified with olefinic hydrocarbons. Sulfur concrete obtained on the basis of the above-mentioned US patents has lower compression strength, bending strength, breaking strength in comparison to the proposed solution, where the sulphur polymer according to the Patent Application P-389668 has been used.

Sulfur polymer obtained according to the P-389668 Patent Application, waste phosphogypsum, D-50 road asphalt, EP-34 silicone emulsion are used for production of granulated polymer-asphalt binder. Sulfur polymer is the product of reaction of copolymerisation of chain sulfur with 2-ethyl-3-propylacrolein modifier occurring in 2-ethylhexyl alcohol solvent at the temperature of approx. 135° C. Waste phosphogypsum contains mostly calcium sulfate dihydrate, it is a waste obtained during production of phosphoric acid. Chemically, phosphogypsum contains mostly calcium sulfate dihydrate, and contains multiple admixtures such as phosphorus, fluorine, aluminium, iron, silicone and their sulphides. D-50 road asphalt is produced from remains from crude oil distillation, has got the Sphere and Ring softening temperature of 42-57° C., penetration of 45-60. EP-34 silicone emulsion is a 5% aqueous solution. Sulfur polymer, waste phosphogypsum, waste slag from copper smelting and granite sand as mineral fillers are used for sulfur concrete production. Sulfur polymer and waste phosphogypsum the same as in the production of granulated polymer-asphalt binder. Waste slag from copper smelting of 0-5 mm granulation possesses in its composition ca. 45% of silicates, ca. 12% of aluminium trioxide, ca. 1% of iron(lll) oxide, ca. 6% of magnesium oxide, ca. 15% of calcium oxide, ca. 0.2% of phosphorus(V) oxide, ca. 0.4% of copper. Granite sand is a mineral of 0-2 mm granulation. As it can be seen from the above, industrial waste such as: waste phosphogypsum, waste slag from copper smelting, sulfur polymer obtained from waste sulfur are used for production of granulated polymer-asphalt binder and sulfur concrete. It affects their utilisation and reduction of industrial waste heaps. If we add to this the emission of carbon dioxide lower than in the production of traditional concretes from Portland cement it can be seen that the object of the invention contributes to the protection of the environment to a significant degree.

The method of production of polymer-asphalt binder and sulfur concrete is illustrated by FIG. 1. In the same installation both granulated polymer-asphalt binder and sulfur concrete can be separately obtained. Production of granulated polymer-asphalt binder according to FIG. 1 is conducted in the following way: to mixer 2 FIG. 1 sulfur polymer from solvent-borne modification in the amount of 40-60% by weight is dosed, and heated in this mixer to the temperature of 135-150° C. at constant mixing. At this temperature sulfur polymer in a liquid form is obtained. Dried waste phosphogypsum in the amount of 20-40% by weight is dosed into it at constant mixing. Upon mixing the sulfur polymer with waste phosphogypsum, if the mixture reaches semi-liquid form, D-50 road asphalt in the amount of 15-20% by weight is dosed into the mixture at the temperature of 135-150° C. and then it dissolves completely in the mixture with sulfur polymer and waste phosphogypsum. During mixing of these components with road asphalt, reactions of the asphalt with them occur at this temperature, as a result of which about 20% by weight of the batched road asphalt reacts, and the metals contained in waste phosphogypsum catalyse the process of cross-linking of hydrocarbons contained in asphalt with sulfur polymer. As a result, even better granulated polymer-asphalt binder of unexpected properties of mixtures such as: softening point by the Sphere and Ring method of 100-120° C., good mechanical strength while retaining slightly resilient character, very good adhesion to sulfur concrete surface and asphaltic concretes, good stability after some period of time, lower sensitivity to temperature changes, lower influence of load intensity changes, can be obtained. It has been used for construction of binder course in proposed new road surfaces FIG. 6 to FIG. 11 and in repair of damaged pavement FIG. 12 to FIG. 13. Produced polymer-asphalt binder flows to the mixer 1 FIG. 1 by the force of gravity where thorough crushing of the binder in order to eliminate inclusions and lumps with the use of two backward-rotating toothed rolls, occurs. Then the polymer-asphalt binder is directed through a net of the mesh diameter of 4 cm to a screw-conveyor feeder 4_FIG. 1. On the net, lumps of solid body are deposited so that they do not block the head of the extruder of binder granules. Thus purified polymer-asphalt binder of the temperature of 135-150° C. flows to the screw-conveyor feeder which has a water-cooled jacket with automatic regulation of cooling water inflow to the screw-conveyor feeder depending on the desired temperature of the cooled polymer-asphalt binder. The temperature of this binder should be such so that the binder at the inlet to the extruder of the binder granules 5 FIG. 1 is in a plastic form. Plastic polymer-asphalt binder is pressed out by the extruder screw through the extruder sieve plate of the mesh diameter of 10 mm inlet, 3 mm or 5 mm outlet. As a result of cutting of the pressed out binder with the use of a resistance wire heated by electricity, granules of the binder are formed, which fall into the solution of silicone emulsion where they are cooled and coated with a thin layer of silicone, which protects the granules against sticking Granules of polymer-asphalt binder, cooled and coated with silicone, are packed into plastic bags or other packaging and then directed to storage in a blacktop production plant for later use.

Production of sulfur concrete according to FIG. 1 runs as follows: sulfur polymer from solvent-borne modification in the amount of 25-35% by weight is dosed to the mixer 2 while heating it to the temperature of 135-150° C. at constant mixing. At this temperature sulfur polymer liquefies. Dried waste phosphogypsum in the amount of 10-20% by weight is dosed to the liquefied sulfur polymer at constant mixing. Admixtures such as: phosphorus, fluorine, aluminium, iron, silicone and their sulphides contained in waste phosphogypsum stabilise the maintaining of polymeric form in sulfur polymer. Waste phosphogypsum is also a valuable filler for sulfur concrete forming. After ca. 30 minutes and homogenizing of sulfur polymer with waste phosphogypsum at the temperature of 135-150° C. the drain valve is opened and the melted mass flows into mixer 1 FIG. 1 where warmed mineral filler, i.e. granite sand in the amount of 10-20% by weight and warmed waste slag from copper smelting of 0-5 mm granulation in the amount of 35-45% by weight, are added to it at constant mixing. Metals and their compounds contained in the waste slag stabilise the polymeric form in the sulfur polymer. Moreover, in the mixer 1 FIG. 1 change of waste slag pH by its neutralisation occurs. Waste phosphogypsum of pH of about 4 affects the pH reaction of waste slag, changing it to pH of about 6.

After thorough mixing with the use of two backward-running toothed rolls, sulfur concrete in a semi-liquid form is obtained and after cooling it is poured into moulds or crushed into grains of 0-1 cm diameter which are packed into bags or other containers. These grains poured out of bags or containers are melted at the temperature of about 130° C. at the site of road surface construction in specialist mobile heating units and are poured in semi-liquid form as the foundation of road surfaces. Use of the produced granulated polymer-asphalt binder and sulfur concrete for new road surface construction is based wholly on their unexpected very good properties which have been already mentioned in the description and being a consequence of using the sulfur polymer according to P-389668 in their production. In road surfaces of categories KR1, KR2, KR3, KR4, KR5, KR6 they have allowed to introduce such structural modifications which cause reduction of road construction and repair costs as well as significant extension of their life time. Use of these materials, that is, the polymer-asphalt binder and sulfur concrete in the construction of new proposed road surfaces is subject to particular rules:

polymer-asphalt binder constructs the binder course of new road surfaces;

basic foundation is made of sulfur concrete;

the road wearing course of asphalt concrete is made traditionally according to the standard in force, only its thickness changes but the sum of the thickness of the new binder course from the polymer-asphalt binder and the thickness of the wearing course gives a standardized thickness of the wearing course from asphaltic concrete. It is possible due to unexpected properties of the binder course from polymer-asphalt binder, which possesses some operational parameters better than the so-called cast asphalts that makes this course both the binder and the bottom of the wearing course from asphaltic concrete. In relation to the fact that in proposed new road surfaces both the binder course from polymer-asphalt binder and the basic foundation from sulfur concrete possess new unexpected very good properties such as good stability after passing of time, lower sensitivity to temperature changes, lower influence of load intensity change, high compression, bending and breaking strengths, suppression of stresses resulting from traffic, small deformations. This has allowed to reduce the auxiliary foundation thickness in relation to the standard thickness, maintaining at the same time the type of material used for construction of the auxiliary foundation in accordance with the standard.

FIG. 6 presents proposed surface of a KR6 type road, in which the wearing course from asphaltic concrete is 2 cm thinner vs. the standard, the binder course from polymer-asphalt binder is 6 cm thinner than the standard, the basic foundation layer from sulfur concrete is 7 cm thinner than the standard, the auxiliary foundation is 2 cm thinner than the standard. In total, the proposed thickness of the road is 17 cm thinner than the standard.

FIG. 7 presents proposed surface of KR5 type road, in which the wearing course from asphaltic concrete is 2 cm thinner vs. the standard, the binder course from polymer-asphalt binder is 6 cm thinner than the standard, the basic foundation layer from sulfur concrete is 5 cm thinner than the standard, the auxiliary foundation is 2 cm thinner than the standard. In total, the proposed thickness of the road is 15 cm thinner than the standard.

FIG. 8 presents proposed surface of KR4 type road, in which the wearing course from asphaltic concrete is 2 cm thinner vs. the standard, the binder course from polymer-asphalt binder is 6 cm thinner than the standard, the basic foundation layer from sulfur concrete is 4 cm thinner than the standard, the auxiliary foundation is 2 cm thinner than the standard. In total, the proposed thickness of the road is 14 cm thinner than the standard.

FIG. 9 presents proposed surface of KR3 type road, in which the wearing course from asphaltic concrete is 2 cm thinner vs. the standard, the binder course from polymer-asphalt binder is 4 cm thinner than the standard, the basic foundation layer from sulfur concrete is 2 cm thinner than the standard, the auxiliary foundation is 2 cm thinner than the standard. In total, the proposed thickness of the road is 10 cm thinner than the standard.

FIG. 10 presents proposed surface of KR2 type road, in which the wearing course from asphaltic concrete is 2 cm thinner vs. the standard, the new 2 cm binder course from polymer-asphalt binder is introduced, the basic foundation from sulfur concrete is 2 cm thinner than the standard, the auxiliary foundation is 4 cm thinner than the standard. In total, the proposed thickness of the road is 6 cm thinner than the standard.

FIG. 1 presents proposed surface of KR1 type road, in which the wearing course from asphaltic concrete is 1 cm thinner vs. the standard, the binder course from polymer-asphalt binder is 2 cm thinner than the standard, the new 3 cm basic foundation from sulfur concrete is introduced, the auxiliary foundation is 6 cm thinner than the standard. In total, the proposed thickness of the road is 6 cm thinner than the standard.

Figure 12:
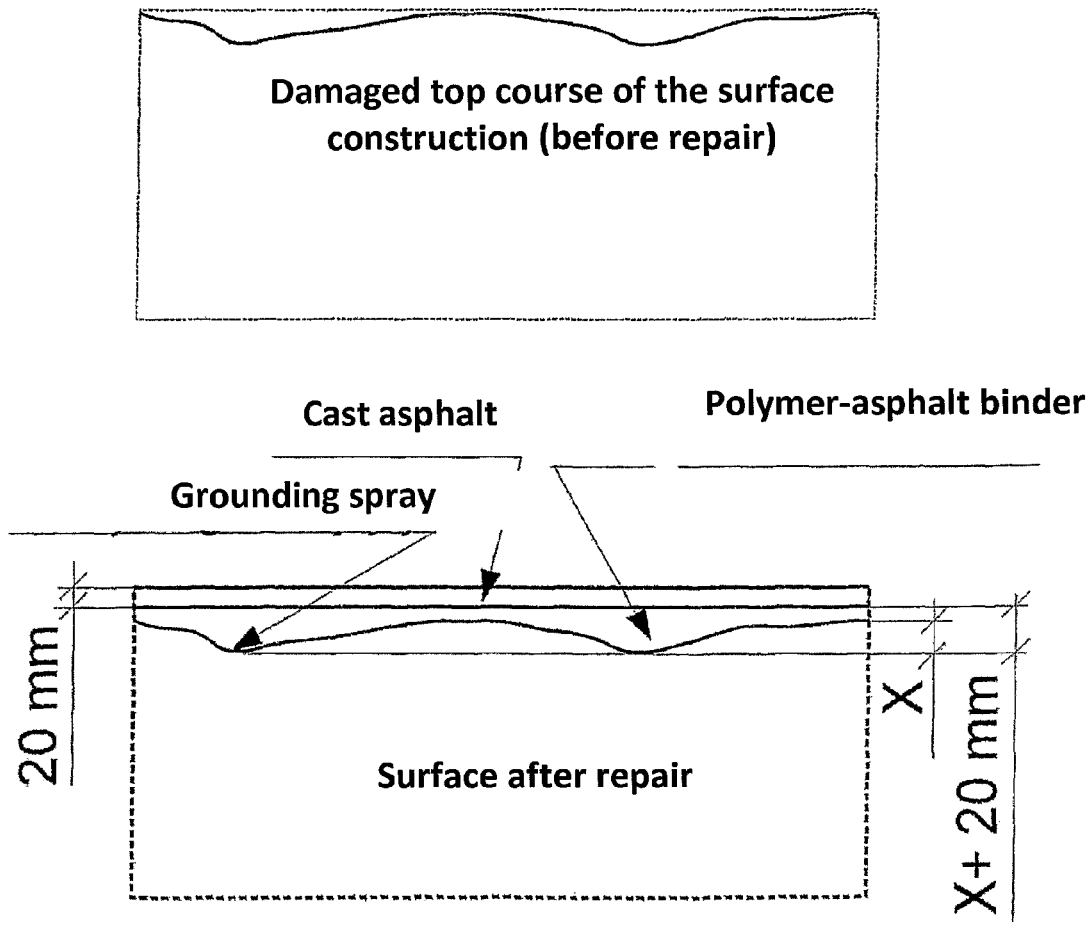

FIG. 12 presents a proposal of concrete road and motorway repair with the use of polymer-asphalt binder. The proposal assumes the following course of action. After the removal of mechanical impurities from the damaged top layer of the surface construction and drying it, a grounding spraying, which gives good adhesion of the polymer-asphalt binder to the damaged layer, is performed. Depending on the depth of the rut×in mm, thickness of the levelling layer from polymer-asphalt binder amounts to x+20 mm. After the above mentioned levelling layer is formed, 20 mm wearing course from cast asphalt is applied; in case of motorways SMA type mineral asphalt mixtures, where asphalt is modified with a polymer, are used.

FIG. 13 presents a proposal of repair of roads on a traditional asphalt binder. Polymer-asphalt binder possesses a very good adhesion to existing asphaltic concretes and melts into their surface. First, holes in the road are provisionally levelled with polymer-asphalt binder mixed with approx. 70% by weight of basalt of 5-11 mm granulation. Depending on the depth of the rut×cm, the thickness of the levelling layer from polymer-asphalt binder mixed with basalt amounts to x−2 cm, and irregularities up to the top level of the existing wearing course are levelled with 2 cm of wearing course from asphaltic concrete.

EXAMPLE I

Granulated polymer-asphalt binder comprising % by weight for preparation of the binder course in road surface and for road repairs
    sulfur polymer 55
    waste phosphogypsum 30
    road asphalt 15
    100

Prepared in the following way. Weighed amounts of sulfur polymer from solvent-borne modification are delivered to the mixer 2 FIG. 1. To this mixer waste phosphogypsum is added, mixed at the temperature of 135-150× with melted sulfur polymer and after they are mixed, road asphalt is added, which dissolves completely and undergoes partial reaction with sulfur polymer at catalyzing influence of metals contained in waste phosphogypsum. Thus polymer-asphalt binder is formed. After 30 minutes and constant mixing of the contents of the mixer 2 FIG. 1 it is directed by the drain valve to the mixer 1 FIG. 1 where lumps and inclusions are eliminated, and then, after cooling with water in a screw conveyor it is pressed out by an extruder and formed in a shape of granules which are cooled and coated with silicone emulsion. Thus obtained polymer-asphalt binder granules are transported to a construction site or road repair site, where in mobile heaters they assume liquid form from which, after pouring out, binder course of road surfaces from polymer-asphalt binder is formed. In case of repair of traditional roads from asphaltic concrete FIG. 13 approx. 70% by weight of basalt of 5-11 mm granulation is added to a mobile heater with an agitator after melting of the granules and after mixing with warm binder it is poured onto the damaged surface, leaving a 2 cm fault in relation to the level of the wearing course for levelling it with traditional asphaltic concrete. In case of repair of concrete roads and motorways, granulated polymer-asphalt binder is melted in a mobile heater with an agitator and poured onto damaged surface FIG. 12, which was cleaned and covered with grounding material beforehand. The levelling layer of polymer-asphalt binder protrudes 20 mm above the surface of the road or motorway. 20 mm layer of cast asphalt is poured onto this layer and in case of motorways, 20 mm of SMA type mineral asphalt mixture where asphalt is modified with polymer.

EXAMPLE II

Sulfur concrete comprising % by weight for production of road surface basic foundation
    sulfur polymer 30
    waste phosphogypsum 20
    waste slag from copper smelting 35
    mineral material granite sand 15
    100

Prepared in the following way. Weighed amounts of sulfur polymer from solvent-borne modification of waste sulfur are delivered to mixer 2 FIG. Waste phosphogypsum is dosed to the mixer mixed with melted sulfur polymer at the temperature of 135-150° C. Metals contained in waste phosphogypsum stabilise the polymeric form of sulfur polymer. After approx. 30 minutes liquid mass from the mixer 2 FIG. 1 is directed to the mixer 1 FIG. 1 where it is mixed for about 30 minutes with hot waste slag from copper smelting and granite sand. Metals and their compounds contained in waste slag stabilise the polymeric form of sulfur polymer; change of waste slag pH to pH of ca. 6 with the use of waste phosphogypsum also occurs. After thorough mixing, sulfur concrete in semi-liquid form is obtained, which is poured into the mould or, after cooling, crushed into grain of diameter of 0-1 cm, which is packed into bags or other containers and then transported to the road construction site, where, loaded into a mobile heater at the temperature of 130° C., sulfur concrete assumes semi-liquid form and is poured and formed as a road surface basic foundation.

EXAMPLE III

Figure Number 6 presents the method of making basic foundation from sulfur concrete and binder course from polymer-asphalt binder on a KR6 type road. Granulated sulfur concrete prepared in Example II is loaded into a mobile heater located at the road construction site. After heating to the temperature of approx. 30° C. it is poured in a semi-liquid form onto a prepared auxiliary foundation 8 cm thick, made from aggregate. From the semi-liquid sulfur concrete a basic foundation from sulfur concrete 11 cm thick is formed and after 2 hours, when the mass solidifies, a binder course from polymer-asphalt binder is applied in the following way. To the same mobile heater in which sulfur concrete was heated before and after it is emptied, granulated polymer-asphalt binder prepared in Example I is loaded from the bags. At the temperature of 130° C. granules of the binder are melted and liquid binder is poured onto prepared basic foundation from sulfur concrete. Binder course from polymer-asphalt binder 2 cm thick is formed; thermal binding of the binder course with the basic foundation occurs. After approx. 2 hours when the mass solidifies, 3 cm of wearing course from traditional asphaltic concrete is applied on it. During application of the above mentioned wearing course its thermal binding with the binder course from polymer-asphalt binder occurs.

EXAMPLE IV

Figure Number 7 presents the method of preparation of a basic foundation from sulfur concrete and a binder course from polymer-asphalt binder on a KR5 type road. Granulated sulfur concrete prepared in Example II is loaded into a mobile heater located at the road construction site. After heating to the temperature of approx. 130° C. it is poured in a semi-liquid form onto a prepared auxiliary foundation 8 cm thick made from aggregate. From the semi-liquid sulfur concrete a basic foundation from sulfur concrete 9 cm thick is formed and after 2 hours, when the mass solidifies, a binder course from polymer-asphalt binder is applied in the following way. To the same mobile heater in which sulfur concrete was heated before and after it is emptied, granulated polymer-asphalt binder prepared in Example I is loaded from the bags. At the temperature of 130° C. granules of the binder are melted and liquid binder is poured onto prepared basic foundation from sulfur concrete. Binder course from polymer-asphalt binder 2 cm thick is formed; thermal binding of the binder course with the basic foundation occurs. After approx. 2 hours when the mass solidifies, 3 cm of wearing course from traditional asphaltic concrete is applied on it. During application of the above mentioned wearing course its thermal binding with the binder course from polymer-asphalt binder occurs.

EXAMPLE V

Figure Number 8 presents the method of preparation of a basic foundation from sulfur concrete and a binder course from polymer-asphalt binder on a KR4 type road. Granulated sulfur concrete prepared in Example II is loaded into a mobile heater located at the road construction site. After heating to the temperature of approx. 130° C. it is poured in a semi-liquid form onto a prepared auxiliary foundation 18 cm thick made from aggregate. From the semi-liquid sulfur concrete a basic foundation from sulfur concrete 6 cm thick is formed and after 2 hours, when the mass solidifies, a binder course from polymer-asphalt binder is applied in the following way. To the same mobile heater in which sulfur concrete was heated before and after it is emptied, granulated polymer-asphalt binder prepared in Example I is loaded from the bags. At the temperature of 130° C. granules of the binder are melted and liquid binder is poured onto prepared basic foundation from sulfur concrete. Binder course from polymer-asphalt binder 2 cm thick is formed; thermal binding of the binder course with the basic foundation also occurs. After approx. 2 hours when the mass solidifies, 3 cm of wearing course from traditional asphaltic concrete is applied on it. During application of the above mentioned wearing course its thermal binding with the binder course from polymer-asphalt binder occurs.

EXAMPLE VI

FIG. 9 presents the method of preparation of a basic foundation from sulfur concrete and a binder course from polymer-asphalt binder on a KR3 type road. Granulated sulfur concrete prepared in Example II is loaded into a mobile heater located at the road construction site. After heating to the temperature of approx. 130° C. it is poured in a semi-liquid form onto a prepared auxiliary foundation 18 cm thick made from aggregate. From the semi-liquid sulfur concrete a basic foundation from sulfur concrete 5 cm thick is formed and after 2 hours, when the mass solidifies, a binder course from polymer-asphalt binder is applied in the following way. To the same mobile heater in which sulfur concrete was heated before and after it is emptied, granulated polymer-asphalt binder prepared in Example I is loaded from the bags. At the temperature of 130° C. granules of the binder are melted and liquid binder is poured onto prepared basic foundation from sulfur concrete. Binder course from polymer asphalt binder 2 cm thick is formed; thermal binding of the binder course with the basic foundation also occurs. After approx. 2 hours when the mass solidifies, 3 cm of wearing course from traditional asphaltic concrete is applied on it. During application of the above mentioned wearing course its thermal binding with the binder course from polymer-asphalt binder occurs.

EXAMPLE VII

FIG. 10 presents the method of preparation of a basic foundation from sulfur concrete and a binder course from polymer-asphalt binder on a KR2 type road. Granulated sulfur concrete prepared in Example II is loaded into a mobile heater located at the road construction site. After heating to the temperature of approx. 130° C. it is poured in a semi-liquid form onto a prepared auxiliary foundation 16 cm thick made from aggregate. From the semi-liquid sulfur concrete a basic foundation from sulfur concrete 5 cm thick is formed and after 2 hours, when the mass solidifies, a binder course from polymer-asphalt binder is applied in the following way. To the same mobile heater in which sulfur concrete was heated before and after it is emptied, granulated polymer-asphalt binder prepared in Example I is loaded from the bags. At the temperature of 130° C. granules of the binder are melted and liquid binder is poured onto prepared basic foundation from sulfur concrete. Binder course from polymer-asphalt binder 2 cm thick is formed; thermal binding of the binder course with the basic foundation also occurs. After approx. 2 hours when the mass solidifies, 3 cm of wearing course from traditional asphaltic concrete is applied on it. During application of the above mentioned wearing course its thermal binding with the binder course from polymer-asphalt binder occurs.

EXAMPLE VIII

FIG. 11 presents the method of preparation of a basic foundation from sulfur concrete and a binder course from polymer-asphalt binder on a KR1 type road. Granulated sulfur concrete prepared in Example II is loaded into a mobile heater located at the road construction site. After heating to the temperature of approx. 130° C. it is poured in a semi-liquid form onto a prepared auxiliary foundation 14 cm thick made from aggregate. From the semi-liquid sulfur concrete a basic foundation from sulfur concrete 3 cm thick is formed and after 2 hours, when the mass solidifies, a binder course from polymer-asphalt binder is applied in the following way. To the same mobile heater in which sulfur concrete was heated before and after it is emptied, granulated polymer-asphalt binder prepared in Example I is loaded from the bags. At the temperature of 130° C. granules of the binder are melted and liquid binder is poured onto prepared basic foundation from sulfur concrete. Binder course from polymer asphalt binder 2 cm thick is formed; thermal binding of the binder course with the basic foundation also occurs. After approx. 2 hours when the mass solidifies, 3 cm of wearing course from traditional asphaltic concrete is applied on it. During application of the above mentioned wearing course its thermal binding with the binder course from polymer-asphalt binder occurs.

EXAMPLE IX

FIG. 12 presents repair of concrete roads and motorways conducted with the use of granulated polymer-asphalt binder prepared according to Example I. The repair progresses as follows. Granulated polymer-asphalt binder from bags or other packaging is loaded into a mobile heater located at the site of damaged road surface repair where at the temperature of 130° C. it is melted and poured onto the damaged surface, which was beforehand cleaned and grounded with a good grounding agent in order to join the damaged surface with the polymer-asphalt binder poured onto it well. If the depth of the damaged road×in mm amounts, for example, to 20 mm, then the total thickness of the poured and formed layer from polymer-asphalt binder amounts to x+20 mm. 20-mm layer of cast asphalt is poured onto such formed levelling surface from polymer-asphalt binder after it solidifies, and in case of motorways, SMA type mineral asphalt mixture where asphalt is modified with polymer.

EXAMPLE X

FIG. 13 presents repair of roads on traditional asphalt binder with the use of granulated polymer-asphalt binder prepared according to Example I. The repair progresses as follows. Granulated polymer-asphalt binder from bags or other packaging is loaded into a mobile heater located at the site of a damaged road repair. At the temperature of 130° C., after the granules are liquefied, basalt of 5-11 mm granulation in the amount of about 70% by weight is added to the heater at constant mixing. Then, repaired ruts in the road are filled with the mixture from the heater. Depending on the depth of the rut×cm thick, thickness of the levelling layer from the mixture of polymer-asphalt binder and basalt amounts to x−2 cm. A fault of 2 cm in relation to the top level of the wearing course is left so that the final levelling of the fault with the top level of the repaired road surface could be made with traditional asphaltic concrete.

The embodiment of the invention in which an exclusive property or privilege is claimed is defined as follows:

1. A method of producing of sulfur polymer comprising: dissolving a liquid modifier 2-ethyl-3-propylacrolein solution of 2-ethylhexyl alcohol forming a liquid solvent; mixing a product of modification of waste sulfur in liquid solvent 45-55% by weight of 2-ethylhexyl alcohol solvent, 10-15% by weight of 2-ethyl-3-propylacrolein modifier, 35-40% by weight of waste sulfur, wherein said mixing is conducted in a mixer and said mixture is heated to a temperature of 120-135° C. for 10-15 minutes.

2. The Method of claim 1 further comprising: batching the 2-ethylhexyl alcohol prior to adding the 2-ethyl-3-propylacrolein solution in the amount of 10-15% by weight.

3. The method of claim 1 further comprising: batching new weighted portions of the waste sulfur on the basis of analysis of double bonds and aldehydes in the mixture after removing the produced sulfur polymer from the mixture.

4. The method of claim 1 wherein the solvent and modifier are heted to the temperature of 120-135° C. at a constant mixing with the rotational speed of approximately 30 revolutions per minute, further wherein at this temperature weighted amounts of waste sulfur are added to the mixture of solvent and the modifier, further wherein the waste sulfur dissolves completely in the solvent and decomposes into chain fragments which undergo the reaction of copolymerization with the modifier particles to produce sulfur polymer.

5. The method of claim 4 wherein particles of sulfur polymer which fall out of the solvent are created.

6. A method of producing of sulfur polymer comprising mixing a mixture in a vertical mixer heated indirectly, at the temperature of 120-135° C. with the agitator rotational speed of approximately 30rpm, where in the mixture comprises: 45-55% by weight of 2-ethylhexyl alcohol as liquid solvent, 10-15% by weight of a liquid modifier comprising 2-ethyl-3-propylacrolein wherein said liquid modifier is dissolved in said solvent; 35-40% by weight of a modification of waste sulfur wherein said mixing continues for 10-15 minutes and the produced sulfur polymer is raw material for production of sulfur concretes and a granulated road binder.

7. The method of claim 6 wherein the granulated road binder uses the sulfur polymer that is the product of the reaction copolymerization of chain sulfur with 2-ethyl-3-propylacrolein modifier occurring in 2-ethylhexyl alcohol solvent at the temperature of approximately 135° C.

8. The method of claim 6 wherein the sulfur polymer, as well as waste phosphogypsum, waste slag from copper smelting and granite sand, as mineral fillers are used for sulfur concrete production.

9. The method of claim 6 wherein the granulated road binder is produced by dosing the sulfur polymer from the solvent-borne modification in the amount of 40-60% by weight and heating the resulting mixture to the temperature of 135-150° C. at a constant mixing to obtain sulfur polymer in a liquid form.

10. The method of claim 6 wherein the sulfur polymer is mixed with waste phosphogypsum producing a mixture in semi-liquid form, and D-50 road asphalt, in the amount of 15-20% by weight is dosed into the mixture.

11. The method of claim 6 wherein the sulfur polymer is mixed with waste phosphogypsum and road asphalt, which results in a reaction where 20% by weight of the asphalt reacts, where metals contained in the waste phosphogypsum catalyze the process of cross-linking of hydrocarbons contained in the asphalt with the sulfur polymer.

\* \* \* \* \*